US012692186B2

(12) United States Patent
Sasaki et al.

(10) Patent No.: US 12,692,186 B2
(45) Date of Patent: Jul. 28, 2026

(54) METHOD FOR MAKING OPTICAL FIBER BUNDLE STRUCTURE, AND METHOD FOR CONNECTING OPTICAL FIBER BUNDLE STRUCTURE WITH MULTICORE FIBER

(71) Applicant: FURUKAWA ELECTRIC CO., LTD., Tokyo (JP)

(72) Inventors: Tsubasa Sasaki, Tokyo (JP); Ryuichi Sugizaki, Tokyo (JP); Masanori Takahashi, Tokyo (JP); Yoshihiro Arashitani, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 150 days.

(21) Appl. No.: 18/594,486

(22) Filed: Mar. 4, 2024

(65) Prior Publication Data

US 2024/0368020 A1     Nov. 7, 2024

(30) Foreign Application Priority Data

Mar. 15, 2023     (JP) ................................. 2023-041261

(51) Int. Cl.
*C03B 37/10*          (2006.01)
*G02B 6/40*          (2006.01)

(52) U.S. Cl.
CPC ................ *C03B 37/10* (2013.01); *G02B 6/40* (2013.01); *C03B 2203/40* (2013.01)

(58) Field of Classification Search
CPC ....... C03B 37/10; C03B 6/40; C03B 2203/40; G02B 6/403
See application file for complete search history.

(56) References Cited

U.S. PATENT DOCUMENTS 6,085,011 A * 7/2000 Klausmann ................ B21J 7/30
                                                                 385/115
2008/0069502 A1* 3/2008 Ma ......................... G02B 6/403
                                                                 65/406
(Continued)

FOREIGN PATENT DOCUMENTS

WO     WO-2012/121320 A1     9/2012
WO     WO-2022/130974 A1     6/2022

OTHER PUBLICATIONS

Jaycon—"Injection Molding 101: Insert Molding" YouTube Video dated Sep. 2, 2017. Accessed at <https://www.youtube.com/watch?v=eblNgZcMz00> (Year: 2017).*
(Continued)

*Primary Examiner* — Alex B Efta
*Assistant Examiner* — Alexander S Wright
(74) *Attorney, Agent, or Firm* — MARSHALL, GERSTEIN & BORUN LLP

(57) ABSTRACT

First, small-diameter portions of a plurality of optical fibers are inserted into a small-diameter capillary. Then, in a state in which the optical fibers are inserted into the small-diameter capillary until end faces of the optical fibers protrude slightly from an end face of the small-diameter capillary, the optical fibers and the small-diameter capillary are fixed together by using an adhesive. Next, a large-diameter capillary is fixed on an outer periphery of the small-diameter capillary. Then, end faces of the large-diameter capillary, the small-diameter capillary, and the optical fibers (the small-diameter portions) are polished collectively to mirror-finish the end faces of the optical fibers. Next, the large-diameter capillary is removed from the small-diameter capillary. In this way, an optical fiber bundle structure can be obtained.

14 Claims, 12 Drawing Sheets

(56) References Cited

U.S. PATENT DOCUMENTS

| | | | |
|---|---|---|---|
| 2014/0010501 A1* | 1/2014 | Saito | ................... G02B 6/2551 |
| | | | 156/182 |
| 2022/0003924 A1* | 1/2022 | Kawasaki | ............... C03C 25/26 |
| 2023/0314700 A1 | 10/2023 | Watanabe et al. | |

OTHER PUBLICATIONS

Neway Precision Parts—"What materials are used in insert molding?" Webpage Accessed at <https://www.newayprecision.com/services/insert-molding/faq-what-materials-are-used-in-insert-molding> Used as evidence, not as prior art. (Year: 2025).*

* cited by examiner

METHOD FOR MAKING OPTICAL FIBER BUNDLE STRUCTURE, AND METHOD FOR CONNECTING OPTICAL FIBER BUNDLE STRUCTURE WITH MULTICORE FIBER

TECHNICAL FIELD

The present invention relates to a method for making an optical fiber bundle structure and the like, in which the optical fiber bundle structure can be connected to a multi-core fiber having cores that are arranged at predetermined intervals.

BACKGROUND

Due to rapidly increasing traffic in optical communications in recent years, transmission capacity has been expected to rise. As a way of further expanding communication capacity, in place of single-core fibers, a multicore fiber in which a plurality of cores are formed in one fiber has been proposed.

When a multicore fiber is used as a transmission path, cores of the multicore fiber are to be connected to corresponding cores of another multicore fiber, or separate single-core optical fibers, light receiving and emitting elements, and/or the like, respectively, to send and/or receive transmission signals. As a method for connecting a multicore fiber to single-core fibers, International Patent Publication WO2012/121320 has proposed a method in which a bundled fiber including single-core optical fibers that are arranged at positions corresponding to the cores of the multicore fiber is inserted into a capillary so as to be connected to the multicore fiber.

Also, International Patent Publication WO2022/130974 has proposed a method for manufacturing a capillary and an optical fiber, in which the capillary is melt-drawn (primary drawing), and a plurality of optical fibers with diameters being reduced to a certain extent are inserted into the primary-drawn capillary and then further melt-drawn (secondary drawing) to melt and reduce the diameters of the capillary and the optical fibers.

SUMMARY OF THE DISCLOSURE

Problems to be Solved by the Invention

To connect an optical fiber bundle structure to a multicore fiber at a low loss with improved reliability, a stable manufacturing of the optical fiber bundle structure using small-diameter capillary is essential. Also, in general, a core pitch of a multicore fiber can be designed around 40 μm, and it is advisable, from a viewpoint of high-density packaging, not to make the core pitch larger. Thus, outer diameters of optical fibers forming the optical fiber bundle structure that is to be connected are to be reduced down to approximately 40 μm.

Furthermore, taking easier handling in the later process into consideration, an outer diameter of the multicore fiber is to be 125 μm, which is an outer diameter of a standard fiber available in the market. Thus, it is preferable, in view points of improving reliability of a connection part and in terms of cost, that the optical fiber bundle structure has an outer diameter that is as close as possible to 125 μm, which is equivalent to the outer diameter of the multicore fiber.

Here, for example, when connecting an optical fiber bundle structure to a multicore fiber including four cores and having an outer diameter of 125 μm, it is preferable that four small-diameter optical fibers, each having an outer diameter of approximately 40 μm, are inserted into a small-diameter capillary having an outer diameter of 125 μm, and end faces of the optical fibers are to be mirror finished. However, to satisfy the above requirements, a wall thickness of the small-diameter capillary is to be approximately 20 μm. If such the capillary is used and the end faces of the plurality of small-diameter optical fibers are polished, chipping of the capillary or the optical fibers may occur and it is difficult to stably obtain mirror-finished end faces of the optical fibers.

The present invention was made in view of such problems. It is an object of the present invention to provide a method for making an optical fiber bundle structure and the like, in which end face polishing can be performed while preventing chipping or the like of a capillary and optical fibers even when small-diameter optical fibers are used.

Means for Solving Problems

To achieve the above object, a first aspect of the present invention is a method for making an optical fiber bundle structure. The optical fiber bundle structure includes a plurality of single-core optical fibers that are assembled together. The method includes inserting the plurality of optical fibers into a small-diameter capillary to be fixed, fixing a large-diameter capillary on an outer periphery of the small-diameter capillary, polishing end faces of the large-diameter capillary, the small-diameter capillary, and the optical fibers, and removing the large-diameter capillary from the small-diameter capillary.

Alternatively, the method for making the optical fiber bundle structure including the plurality of single-core optical fibers that are assembled together may include inserting the plurality of optical fibers into a capillary having a double layer structure to be fixed, in which the double layer structure includes a small-diameter capillary and a large-diameter capillary that is fixed on an outer periphery of the small-diameter capillary, polishing end faces of the large-diameter capillary, the small-diameter capillary, and the optical fibers, and removing the large-diameter capillary from the small-diameter capillary.

A slit may be formed over an entire length at a part of a circumferential direction of the large-diameter capillary.

The large-diameter capillary may be divided into a plurality of sections in the circumferential direction.

The large-diameter capillary may be formed by disposing melted resin around the outer periphery of the small-diameter capillary and solidifying the resin.

It is preferable that the resin is thermoplastic resin with no coupling agent.

The large-diameter capillary may be formed by insert molding.

According to the first aspect of the present invention, the large-diameter capillary is fixed to an outer periphery part of the small-diameter capillary and polishing is carried out with the large-diameter capillary being fixed, thereby allowing the polishing to be stable. This can prevent occurrence of chipping or the like of the small-diameter capillary or the optical fibers at the time of polishing. In addition, the large-diameter capillary is to be removed after polishing, and thus an outer diameter of the small-diameter capillary and an outer diameter of a multicore fiber can be matched at the time of connecting to the multicore fiber.

Also, the slit formed in the large-diameter capillary facilitates removing operation of the large-diameter capillary after polishing.

Similarly, dividing the large-diameter capillary in the circumferential direction and assembling the divided bodies to form the capillary facilitates the removing operation of the large-diameter capillary after polishing.

Also, disposing the melted resin around the outer periphery of the small-diameter capillary and solidifying the resin to form the large-diameter capillary facilitate forming the large-diameter capillary around the outer periphery of the small-diameter capillary.

At this time, if the resin is thermoplastic resin, the large-diameter capillary can be removed from the outer periphery of the small-diameter capillary by heating and melting the resin easily. At this time, if the resin includes no coupling agent, the resin has high mold-releasability with respect to the small-diameter capillary, and this facilitates the removing operation.

Such the large-diameter capillary can be molded easily by insert molding after disposing the small-diameter capillary inside a metal mold.

A second aspect of the present invention is a method for connecting an optical fiber bundle structure to a multicore fiber, in which the optical fiber bundle structure is made by the method for making the optical fiber bundle structure according to the first aspect of the present invention. The multicore fiber includes a plurality of cores disposed in a cladding, and an outer diameter of the small-diameter capillary is substantially identical to an outer diameter of the multicore fiber. The optical fibers of the optical fiber bundle structure are aligned with the cores of the multicore fiber, and an end face of the optical fiber bundle structure is butted against an end face of the multicore fiber so as to be connected to each other.

According to the second aspect of the present invention, the connection is carried out with the outer diameter of the small-diameter capillary substantially matching the outer diameter of the multicore fiber. Thus, reliability of the connection is high and a downsized and lightweight connection structure can be obtained.

Effects of the Invention

The present invention can provide a method for making an optical fiber bundle structure and the like, in which end face polishing can be performed while preventing chipping or the like of a capillary and optical fibers even when small-diameter optical fibers are used.

DETAILED DESCRIPTION

Figure 1:
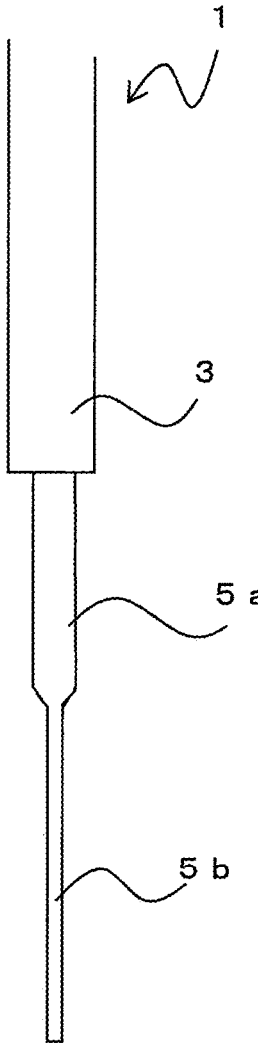
FIG. 1 is a schematic view showing an optical fiber 1.

Hereinafter, a method for making an optical fiber bundle structure will be described. FIG. 1 is a schematic view showing a structure of an optical fiber that is to be used in a present embodiment. An optical fiber 1 shown in FIG. 1 includes a single-core glass fiber 5a and a coating portion 3 that is formed around an outer periphery of the glass fiber 5a.

At a tip end portion of the optical fiber 1, a predetermined length of the coating portion 3 is peeled off, thereby exposing the glass fiber 5a. Also, the optical fiber 1 is an etching fiber having a small-diameter portion 5b, which is formed at a tip end portion of the glass fiber 5a by chemical etching. For example, the glass fiber 5a having a cladding diameter of 125 μm has a diameter of 40 μm at the small-diameter portion 5b.

Figure 2:
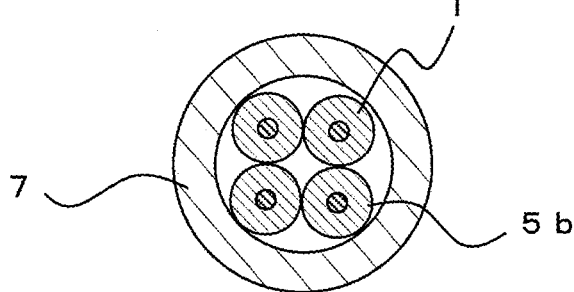
FIG. 2A is a cross-sectional view showing a state in which the optical fibers 1 are inserted into a small-diameter capillary 7.
FIG. 2B is a cross-sectional view showing a state in which the optical fibers 1 are fixed to the small-diameter capillary 7 by using an adhesive 9.
FIG. 2C is a cross-sectional view showing a state in which a large-diameter capillary 11 is fixed to an outer periphery of the small-diameter capillary 7.
Figure 2:
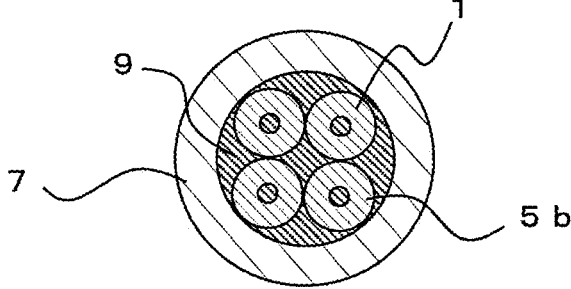
Figure 2:
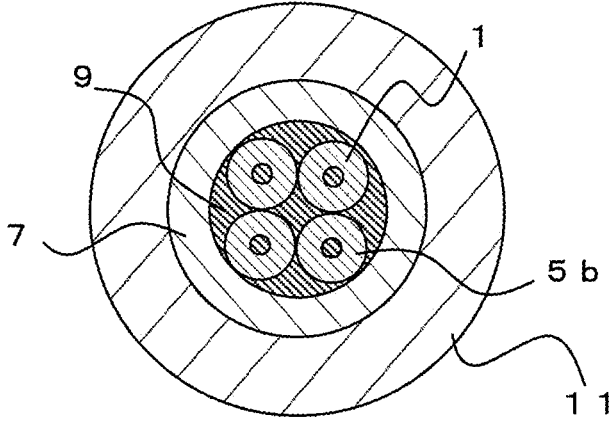

Next, the method for making the optical fiber bundle structure in which a plurality of the optical fibers 1 are assembled together will be described. Firstly, as shown in FIG. 2A, the small-diameter portions 5b of the plurality of the optical fibers 1 are inserted into a small-diameter capillary 7.

The optical fibers 1 are inserted into the small-diameter capillary 7 until end faces of the optical fibers protrude slightly from an end face of the small-diameter capillary 7. In such the state, the optical fibers 1 and the small-diameter capillary 7 are then fixed together with an adhesive 9 as shown in FIG. 2B. Note that, by immersing tip ends of the optical fibers 1 in the adhesive 9, the adhesive 9 can be introduced by capillary action into spaces between the optical fibers as well as into spaces between the optical fibers 1 and the small-diameter capillary 7. This is followed by heating and drying, such that the optical fibers 1 and the small-diameter capillary 7 can be fixed together by adhesion. Any other method for curing the adhesive 9, including ultraviolet curing, may also be used.

Figure 3:
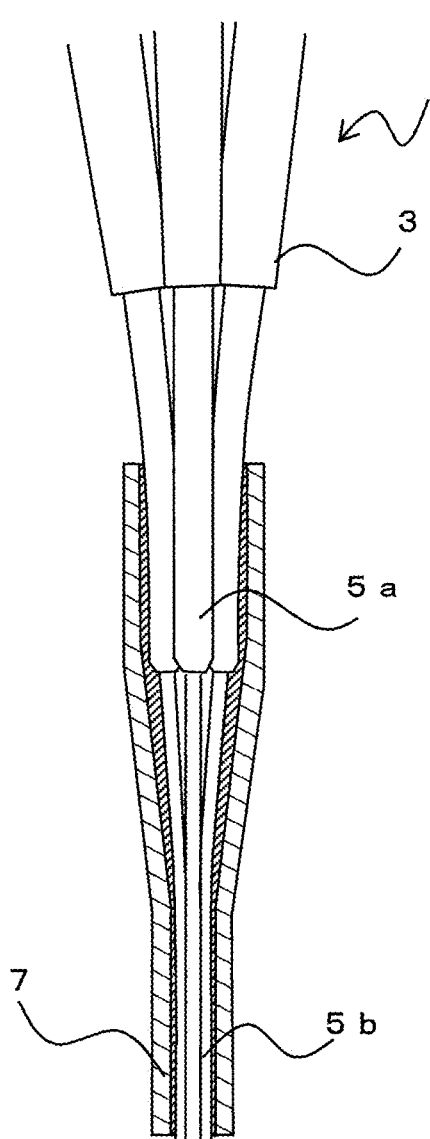
FIG. 3 is a view showing a state in which the optical fibers 1 are fixed to the small-diameter capillary 7.

FIG. 3 is a cross-sectional view taken along an axial direction, showing a state in which the small-diameter capillary 7 is fixed to the tip ends of the optical fibers 1 (the glass fibers 5a). The small-diameter capillary 7 is made of glass, for example. One of end sides of the small-diameter capillary 7 is a part with small outer and inner diameters, into which the small-diameter portion 5b is to be inserted.

The other end side of the small-diameter capillary 7 has large inner and outer diameters such that a uniform-diameter portion of the glass fiber 5a can be inserted. Also, between the minimum outer diameter portion and the maximum outer diameter portion, the diameters change gradually being tapered.

The outer diameter of the small-diameter capillary 7 on the outer periphery of the small-diameter portion 5b is substantially identical to an outer diameter of a multicore fiber, which will be described below, and is 125 μm, for example. Also, the inner diameter of the small-diameter capillary 7 on the outer periphery of the small-diameter portion 5b is determined according to the number of optical fibers to be inserted: when four of the small-diameter portion 5b having a diameter of 40 μm are to be inserted, the inner diameter is 100 μm, for example.

Although the illustrated example shows the bundle structure including four of the optical fibers 1, the number of the optical fibers 1 is not specifically limited. Also, a shape of the small-diameter capillary 7 is to be capable of at least holding the small-diameter portion 5b and shapes of the remaining parts are not specifically limited.

Figure 4:
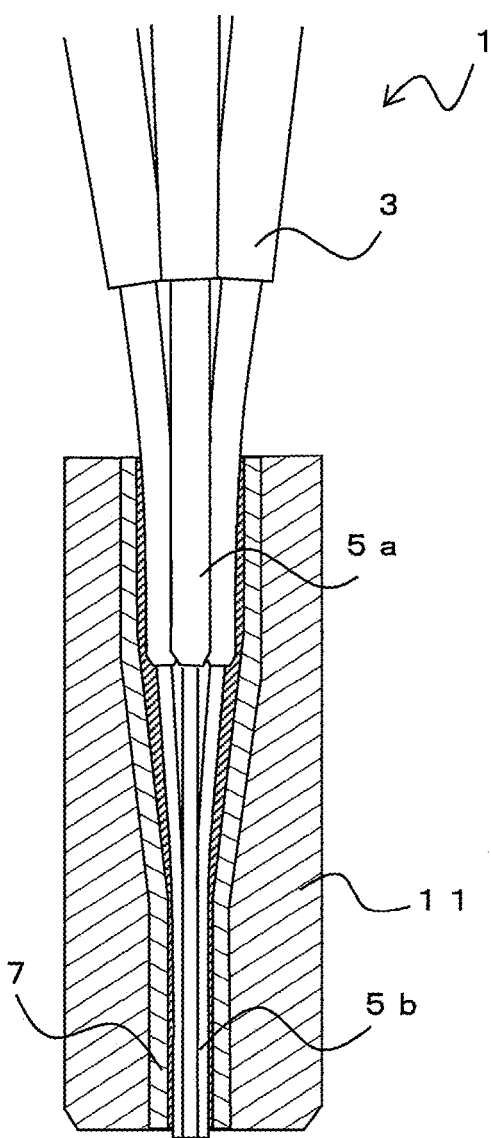
FIG. 4 is a view showing a state in which the large-diameter capillary 11 is fixed to the small-diameter capillary 7.

Next, as shown in FIG. 2C and FIG. 4, a large-diameter capillary 11 is fixed to an outer periphery of the small-diameter capillary 7. The large-diameter capillary 11 is formed of thermoplastic resin such as PMMA or ABS. When taking adhesiveness with the small-diameter capillary 7 and organic solvent resistance into consideration, the resin is preferably amorphous thermoplastic resin. Unlimited methods for fixing the small-diameter capillary 7 with the large-diameter capillary 11 include fixing by adhesive and fusion fixing of thermoplastic resin.

An outer diameter of the large-diameter capillary 11 is substantially uniform. Also, an inner diameter of the large-diameter capillary 11 corresponds to the outer diameter of the small-diameter capillary 7. For example, in the illustrated example, similarly to the change in the outer diameter of the small-diameter capillary 7, the inner diameter of the large-diameter capillary 11 is small on one end side, is large on the other end side, and varies in the middle being tapered.

The inner diameter of the large-diameter capillary 11 is to be large enough such that the small-diameter capillary 7 can be inserted therein: when inserting the small-diameter capillary 7 having the outer diameter of 125 μm, the inner diameter at a part of the large-diameter capillary 11 that corresponds to the small-diameter portion 5b is 130 μm, for example. Also, the outer diameter of the large-diameter capillary 11, which is determined taking handling ability and polishing workability into consideration, is 1 mm, for example.

Preferably, the large-diameter capillary 11 is formed over a substantially entire length of the small-diameter capillary 7 to have substantially the same length as the small-diameter capillary 7. However, if positions of end faces of the small-diameter capillary 7 and the large-diameter capillary 11 are aligned at least on the end face side that is to be polished, then the positions may differ lengthwise on the other end side.

Figure 5:
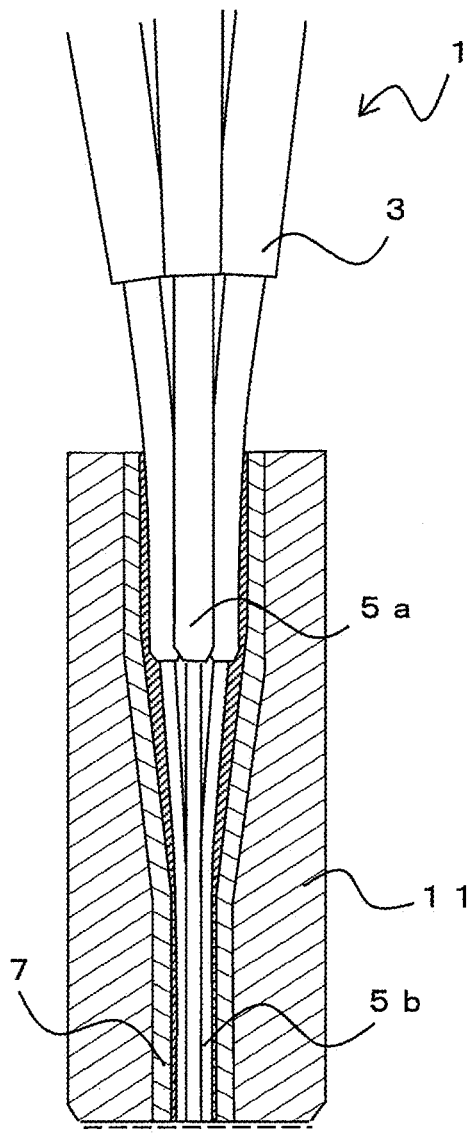
FIG. 5 is a view showing a step of polishing end faces of the optical fibers 1.

Next, as shown in FIG. 5, the end faces of the large-diameter capillary 11, the small-diameter capillary 7 and the optical fibers 1 (the small-diameter portions 5b) are polished collectively so as to mirror finish the end faces of the optical fibers 1.

Figure 6:
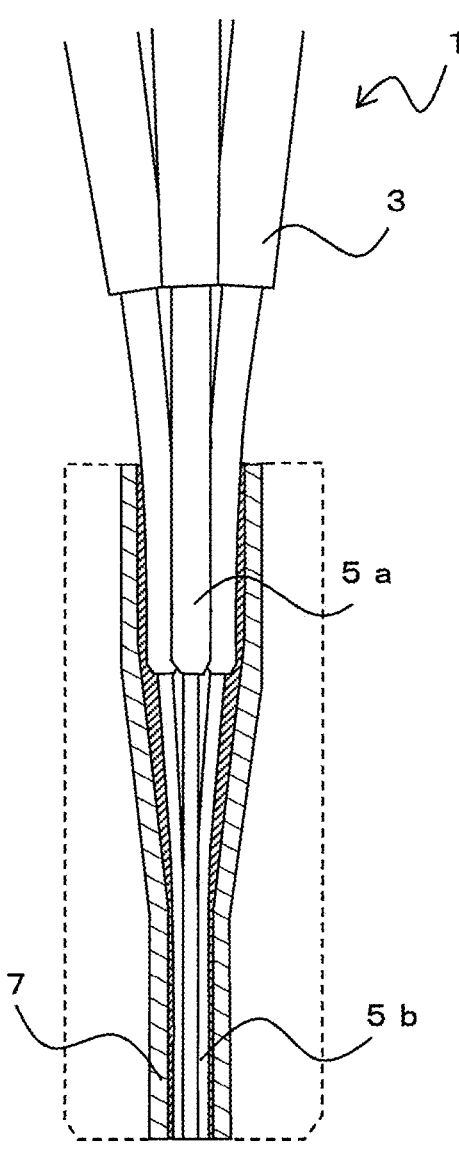
FIG. 6 is a view showing an optical fiber bundle structure 13 with the large-diameter capillary 11 being removed.

Next, as shown in FIG. 6, the large-diameter capillary 11 is removed from the small-diameter capillary 7. As a method for removing the large-diameter capillary 11, an organic solvent such as acetone may be used to melt the large-diameter capillary 11, or the large-diameter capillary 11 may be heated and softened to be removed. In this way, the optical fiber bundle structure 13 can be obtained.

When forming the large-diameter capillary 11 of thermoplastic resin, it is preferable that the thermoplastic resin includes no coupling agent. This can enhance detachability between the large-diameter capillary 11 (the thermoplastic resin) and the small-diameter capillary 7. In addition, the detachability can be further enhanced by not using a primer (a coupling agent) on an outer periphery surface of the small-diameter capillary 7. This facilitates the removing operation of the large-diameter capillary 11.

Although the large-diameter capillary 11 is fixed to the outer periphery of the small-diameter capillary 7 after inserting and fixing the optical fibers 1 into the small-diameter capillary 7 in the above-mentioned embodiment, an order of the procedures can be reversed. For example, the large-diameter capillary 11 is formed on the outer periphery of the small-diameter capillary 7 first so as to form a capillary having a double-layered structure including the small-diameter capillary 7 and the large-diameter capillary 11 that is fixed on the outer periphery of the small-diameter capillary 7. Then, the plurality of optical fibers 1 may be inserted into the capillary having the double-layered structure to be fixed. Also in such the case, the similar procedures of polishing and removing of the large-diameter capillary 11 follow so that the optical fiber bundle structure 13 can be obtained.

Figure 7:
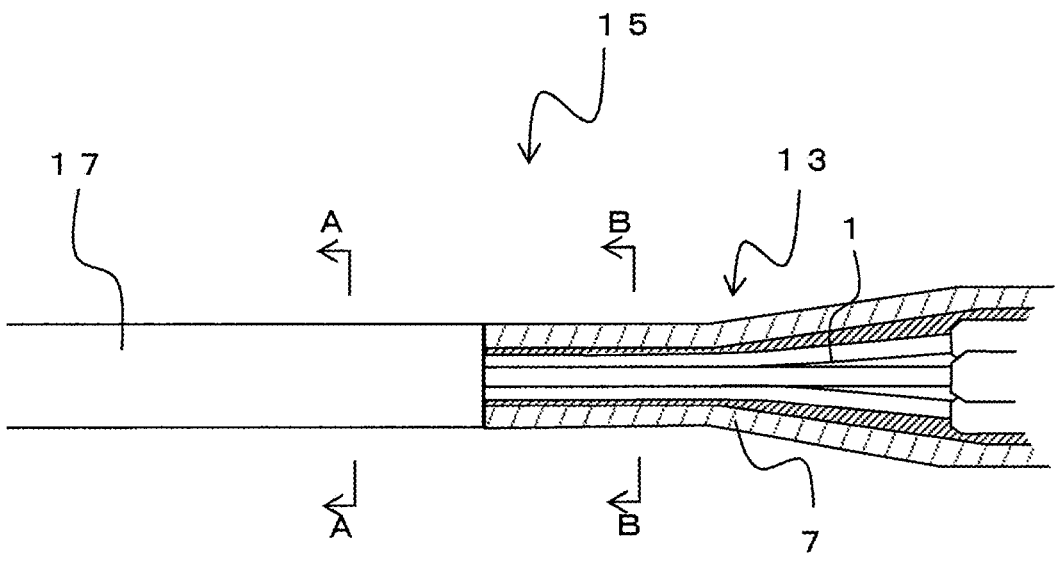
FIG. 7 is a view showing an optical fiber connection structure 15 including the optical fiber bundle structure 13 and a multicore fiber 17.
Figure 8:
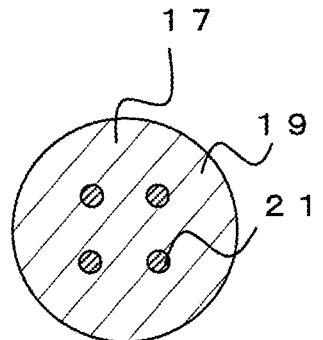
FIG. 8A is a cross-sectional view taken along A-A line in FIG. 7.
FIG. 8B is a cross-sectional view taken along B-B line in FIG. 7.
Figure 8:
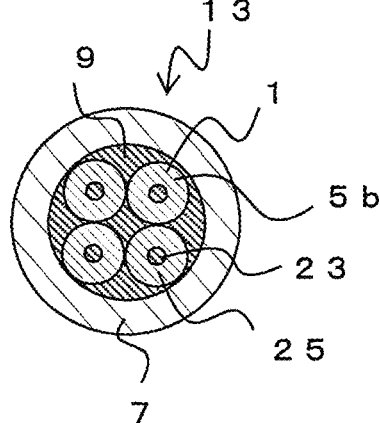

Next, a method for connecting the optical fiber bundle structure 13 that is made by the above-mentioned method for making the optical fiber bundle structure to a multicore fiber will be described. FIG. 7 is a view showing an optical fiber connection structure 15 in which the optical fiber bundle structure 13 and a multicore fiber 17 are connected to each other. Also, FIG. 8A is a cross-sectional view taken along A-A line in FIG. 7, and FIG. 8B is a cross-sectional view taken along B-B line in FIG. 7.

As shown in FIG. 8A, the multicore fiber 17 includes a plurality of cores 21 that are disposed at equal intervals inside a cladding 19. Although the illustrated example shows the multicore fiber 17 that is to be connected to the four-core optical fiber bundle structure 13, positions and the number of the cores 21 are not limited to the illustrated example.

Also, as shown in FIG. 8B, in the optical fiber bundle structure 13, the plurality of optical fibers 1 are inserted into the small-diameter capillary 7 and fixed by the adhesive 9. The optical fiber 1 is a single-core optical fiber in which one core 25 is disposed at the center of a cladding 23.

Firstly, the optical fiber bundle structure 13 and the multicore fiber 17 are disposed so as to face each other, and the cores 25 of the optical fibers 1 of the optical fiber bundle structure 13 are aligned with the cores 21 of the multicore fiber 17. Secondly, as shown in FIG. 7, an end face of the optical fiber bundle structure 13 and an end face of the multicore fiber 17 are butted against each other and connected by using optical adhesive, for example, to obtain the optical fiber connection structure 15. As mentioned above, since the outer diameter of the small-diameter capillary 7 is substantially identical to the outer diameter of the multicore fiber 17, the connection can be carried out with high reliability at the time of connection. Also, since the outer diameter of the small-diameter capillary 7 is small, downsizing and weight reduction of a connection part can be achieved.

As above, according to the present embodiment, by using the large-diameter capillary 11 when polishing the end faces of the optical fibers 1, it is possible to prevent damaging the small-diameter capillary 7 and the optical fibers 1 at the time of polishing. Meanwhile, when connecting to the multicore fiber 17, the large-diameter capillary 11 is removed and the multicore fiber 17 is connected to the small-diameter capillary 7. That is, the multicore fiber 17 can be connected to the optical fiber bundle structure 13 having the same diameter as the multicore fiber 17.

At this time, by forming the large-diameter capillary 11 of thermoplastic resin or the like, the large-diameter capillary 11 can be easily removed in regard to the glass-made small-diameter capillary 7. Also, making the thermoplastic resin not to include a coupling agent can enhance detachability with respect to the small-diameter capillary 7, which further facilitates removing of the large-diameter capillary 11.

Figure 9:
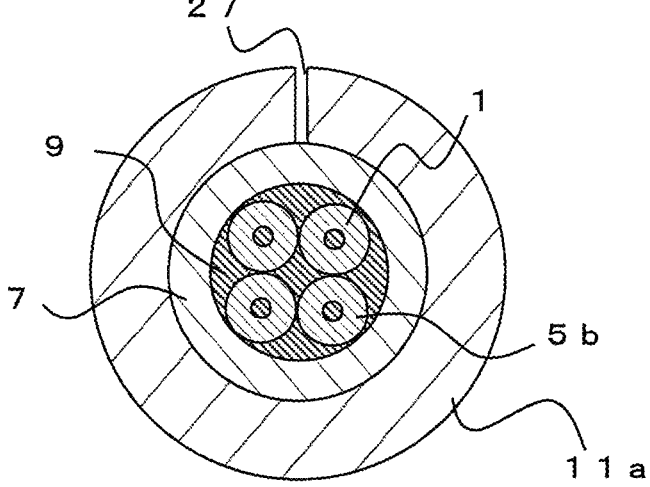
FIG. 9A is a view showing a state in which a large-diameter capillary 11a with a slit 27 being formed is used.
FIG. 9B is a view showing a state in which a large-diameter capillary 11b that is divided into a plurality of sections in a circumferential direction is used.
Figure 9:
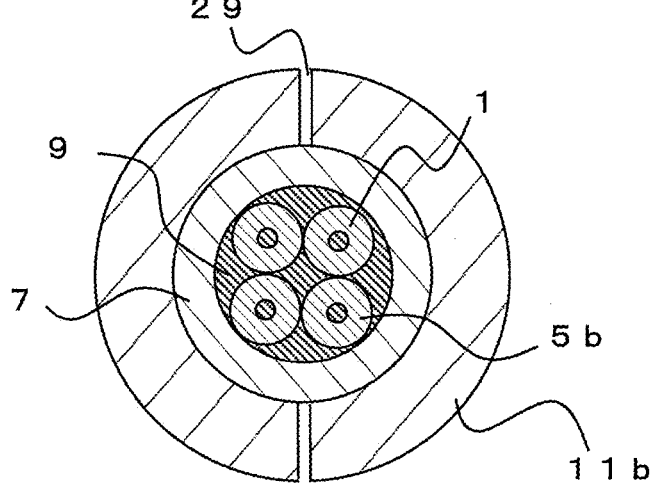

Next, a second embodiment will be described. FIG. 9A is a cross-sectional view of an optical fiber bundle structure according to the second embodiment. In the descriptions hereafter, for structures showing the same functions as in the first embodiment, the same notations used in FIG. 1 to FIG. 8B will be used and redundant explanations will be omitted.

The second embodiment is substantially similar to the first embodiment except that a large-diameter capillary 11a is used. The large-diameter capillary 11a is the large-diameter capillary 11 with a slit 27 that is formed over an entire section at a part of a circumferential direction thereof. That is, the large-diameter capillary 11a is not continuous in the circumferential direction and has a gap at one part.

Providing the slit 27 at a part of the large-diameter capillary 11a as above facilitates removing operation of the large-diameter capillary 11a, with the slit 27 as a starting point. At the slit 27, there may be a gap formed or end faces thereof may partly be in contact.

Also, as shown in FIG. 9B, a large-diameter capillary 11b may be used. The large-diameter capillary 11b is divided by a plurality of dividing portions 29 into a plurality of sections in a circumferential direction. For example, as shown in the drawing, a pair of halved members are faced each other and assembled to form the substantially cylindrical shaped large-diameter capillary 11b as a whole.

Dividing the large-diameter capillary 11b in the circumferential direction as above facilitates removing operation of the large-diameter capillary 11b, with the dividing portions 29 as starting points. The number of sections by the division is not limited to two and should be more than one, and may be three or four, for example.

According to the second embodiment, the same effects as in the first embodiment can be obtained. Also, providing the slit 27 or the dividing portions 29 at a part of the large-diameter capillary as the starting point for removing facilitates the removing operation of the large-diameter capillary after polishing.

Figure 10:
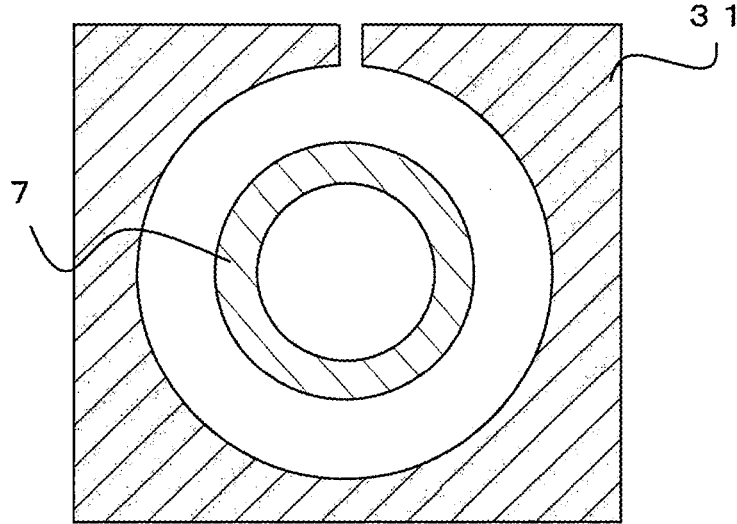
FIG. 10A is a view showing a state in which the small-diameter capillary 7 is set inside a metal mold 31.
FIG. 10B is a view showing a state in which a large-diameter capillary 11c is formed by insert molding.
Figure 10:
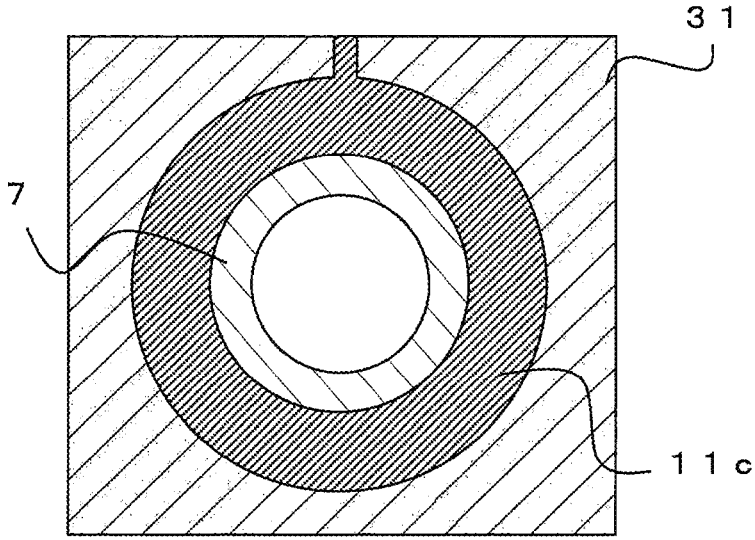

Next, a third embodiment will be described. FIG. 10A and FIG. 10B are views showing a method for making the optical fiber bundle structure according to the third embodiment. In the present embodiment, as shown in FIG. 10A, firstly, the small-capillary 7 is disposed inside a metal mold 31. In such the state, as shown in FIG. 10B, melted resin is injected around the outer periphery of the small-diameter capillary 7 and solidified. That is, a large-diameter capillary 11c of the present embodiment is formed by disposing and solidifying the melted resin around the outer periphery of the small-diameter capillary 7.

The large-diameter capillary 11 may be formed by insert molding as above. In the above-mentioned embodiment, an example in which the optical fibers 1 are inserted, fixed, and polished after the large-diameter capillary 11c is formed around the outer periphery of the small-diameter capillary 7 is shown. However, the large-diameter capillary 11c may be formed by insert molding after fixing the optical fibers 1 to the small-diameter capillary 7.

According to the third embodiment, the same effects as in the first embodiment can be obtained. Also, forming the large-diameter capillary 11c by insert molding can facilitate forming the large-diameter capillary 11c around the outer periphery of the small-diameter capillary 7.

Note that even in the first embodiment or in the second embodiment, instead of using the already-formed large-diameter capillary 11, 11a, or 11b, the large-diameter capillary may be formed by disposing and solidifying melted resin around the outer periphery of the small-diameter capillary 7.

Also, in each of the above-mentioned embodiments, although an example in which a cross-sectional shape of the large-diameter capillary is circular has been shown, the cross-sectional shape of the large-diameter capillary is not limited to a circle as shown in the drawings. For example, the large-diameter capillary may be in a polygonal shape with a flat surface on at least a part of an outer periphery surface of the large-diameter capillary such that handling of the large-diameter capillary 11 with a tool or the like is facilitated.

Also, the large-diameter capillary may not have a uniform shape in a longitudinal direction over an entire length thereof. For example, a level difference, in a side view, may be formed on an outer periphery surface of the large-diameter capillary such that the outer diameter on one end is larger than the outer diameter on the other end. Forming the level difference by changing the outer diameter in the longitudinal direction of the large-diameter capillary facilitates removing operation of the large-diameter capillary with the level difference as a starting point.

Figure 11:
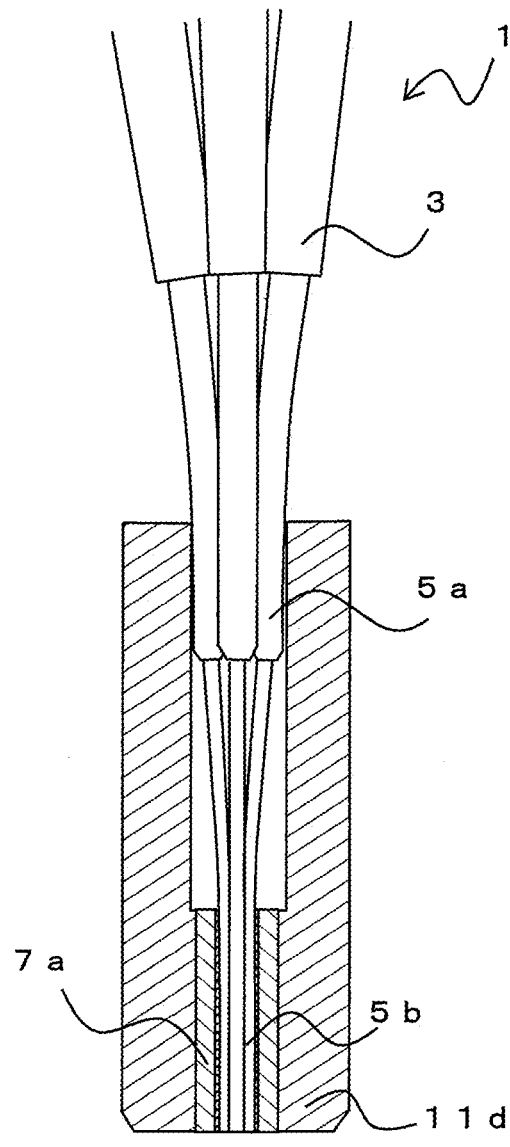
FIG. 11 is a view showing another state in which the large-diameter capillary 11 is fixed to the small-diameter capillary 7.

Also, in the above-mentioned examples, examples in which the inner diameter and the outer diameter of the small-diameter capillary 7 change are shown. Alternatively, as shown in FIG. 11, a small-diameter capillary 7a may also be used. The small-diameter capillary 7a has substantially uniform inner and outer diameters and only the small-diameter portions 5b are to be inserted therein.

In such the case, a large-diameter capillary 11d, which is longer than the small-diameter capillary 7a, is used on the outer periphery of the small-diameter capillary 7a. For example, the small-diameter capillary 7a is disposed on one end side of the large-diameter capillary 11d, and uniform-diameter parts of the glass fibers 5a are disposed on the other end side of the large-diameter capillary 11d. An inner diameter of the large-diameter capillary 11d may be uniform, or may change in a tapered shape. Also, the inner diameter may change via a level difference formed between a part where the small-diameter capillary 7a is disposed and a part where the glass fibers 5a are disposed.

Figure 12:
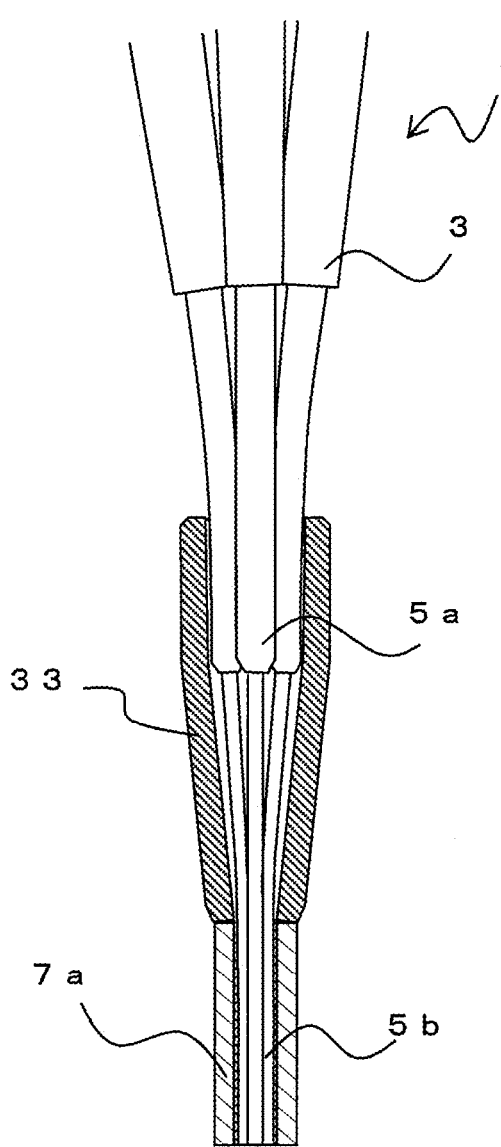
FIG. 12 is a view showing a state in which the large-diameter capillary 11 is removed and a sleeve 33 is fixed.

Also, when polishing with use of the large-diameter capillary 11d is done and the large-diameter capillary 11d is removed after the polishing, a sleeve 33 may be disposed as shown in FIG. 12, so as to cover at least a part of the glass fibers 5a that are exposed from the small-diameter capillary 7a. The sleeve 33 is a cylindrical member, which is a member for covering and reinforcing the optical fibers 1 at a part between the small-diameter portions 5b and the uniform-diameter part. For the sleeve 33, a reinforcing sleeve or the like in which thermoplastic resin and tension member are inserted inside a heat-shrinkable tube, like one used for a fusion connection portion between optical fibers, may be applicable.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

The invention claimed is:

1. A method for making an optical fiber bundle structure, the optical fiber bundle structure including a plurality of optical fibers that are assembled together, the method comprising:

inserting the plurality of optical fibers into a small-diameter capillary to be fixed;

fixing a large-diameter capillary on an outer periphery of the small-diameter capillary such that positions of end faces of the small-diameter capillary and the large-diameter capillary are aligned;

polishing end faces of the large-diameter capillary, the small-diameter capillary, and the optical fibers collectively; and removing the large-diameter capillary from the small-diameter capillary.

2. A method for making an optical fiber bundle structure, the optical fiber bundle structure including a plurality of optical fibers that are assembled together, the method comprising:

inserting the plurality of optical fibers into a capillary having a double layer structure to be fixed, the double layer structure including a small-diameter capillary and a large-diameter capillary that is fixed on an outer periphery of the small-diameter capillary such that positions of end faces of the small-diameter capillary and the large-diameter capillary are aligned;

polishing end faces of the large-diameter capillary, the small-diameter capillary, and the optical fibers collectively; and removing the large-diameter capillary from the small-diameter capillary.

3. The method for making the optical fiber bundle structure according to claim 1, wherein a slit is formed over an entire length at a part of a circumferential direction of the large-diameter capillary.

4. The method for making the optical fiber bundle structure according to claim 2, wherein a slit is formed over an entire length at a part of a circumferential direction of the large-diameter capillary.

5. The method for making the optical fiber bundle structure according to claim 1, wherein the large-diameter capillary is divided into a plurality of sections in a circumferential direction.

6. The method for making the optical fiber bundle structure according to claim 2, wherein the large-diameter capillary is divided into a plurality of sections in a circumferential direction.

7. The method for making the optical fiber bundle structure according to claim 1, wherein the large-diameter capillary is formed by disposing melted resin around the outer periphery of the small-diameter capillary and solidifying the resin.

8. The method for making the optical fiber bundle structure according to claim 2, wherein the large-diameter capillary is formed by disposing melted resin around the outer periphery of the small-diameter capillary and solidifying the resin.

9. The method for making the optical fiber bundle structure according to claim 7, wherein the resin is thermoplastic resin with no coupling agent.

10. The method for making the optical fiber bundle structure according to claim 8 wherein the resin is thermoplastic resin with no coupling agent.

11. The method for making the optical fiber bundle structure according to claim 7, wherein the large-diameter capillary is formed by insert molding.

12. The method for making the optical fiber bundle structure according to claim 8, wherein the large-diameter capillary is formed by insert molding.

13. A method for connecting an optical fiber bundle structure to a multicore fiber, the optical fiber bundle structure being made by the method for making the optical fiber bundle structure according to claim 1, wherein:

the multicore fiber includes a plurality of cores disposed in a cladding;

an outer diameter of the small-diameter capillary is substantially identical to an outer diameter of the multicore fiber; and the optical fibers of the optical fiber bundle structure are aligned with the cores of the multicore fiber, and an end face of the optical fiber bundle structure is butted against an end face of the multicore fiber so as to be connected to each other.

14. A method for connecting an optical fiber bundle structure to a multicore fiber, the optical fiber bundle structure being made by the method for making the optical fiber bundle structure according to claim 2, wherein:

the multicore fiber includes a plurality of cores disposed in a cladding;

an outer diameter of the small-diameter capillary is substantially identical to an outer diameter of the multicore fiber; and the optical fibers of the optical fiber bundle structure are aligned with the cores of the multicore fiber, and an end face of the optical fiber bundle structure is butted against an end face of the multicore fiber so as to be connected to each other.

* * * * *